United States Patent
Schmitt et al.

(10) Patent No.: US 10,204,405 B2
(45) Date of Patent: *Feb. 12, 2019

(54) APPARATUS AND METHOD FOR PARAMETERIZING A PLANT

(71) Applicant: Fraunhofer-Gesellschaft zur Foerderung der angewandten Forschung e.V., Munich (DE)

(72) Inventors: Peter Schmitt, Erlangen (DE); Franz Uhrmann, Erlangen (DE); Matthias Kube, Fuerth (DE); Guenther Kostka, Erlangen (DE)

(73) Assignee: Fraunhofer-Gesellschaft zur Foerderung der angewandten Forschung e.V. (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,309

(22) Filed: Oct. 6, 2017

(65) Prior Publication Data
US 2018/0047146 A1 Feb. 15, 2018

Related U.S. Application Data (63) Continuation of application No. 14/941,093, filed on Nov. 13, 2015, now Pat. No. 9,886,749, which is a (Continued)

(30) Foreign Application Priority Data

May 16, 2013 (DE) .................. 10 2013 209 109

(51) Int. Cl.
*G06K 9/00* (2006.01)
*G06T 7/00* (2017.01)
(Continued)

(52) U.S. Cl.
CPC ........ *G06T 7/0002* (2013.01); *G06K 9/00201* (2013.01); *G06T 7/60* (2013.01);
(Continued)

(58) Field of Classification Search
CPC ........... G06T 7/0002; G06T 7/64; G06T 7/62; G06T 7/75; G06K 9/00201
See application file for complete search history.

(56) References Cited

U.S. PATENT DOCUMENTS 4,710,876 A 12/1987 Cline et al.
9,547,793 B2 * 1/2017 Li .................. A01G 1/001
(Continued)

FOREIGN PATENT DOCUMENTS

CN 201310138373 A * 4/2013 ......... G06K 9/00657
CN 201310138373 A 4/2013
(Continued)

OTHER PUBLICATIONS

Kaminuma, Eli, Yoshizumi, Takeshi, Wada, Takuki, Matsui, Minami, Toyoda, Testuro "Quantitivative analysis of heterogeneous spatial distribution of *Arabidopsis* leaf trichomes using micro X-ray computed tomography" The Plant Journal 2008.*
(Continued)

*Primary Examiner* — Kim Y Vu
*Assistant Examiner* — Molly Delaney
(74) *Attorney, Agent, or Firm* — Haynes and Boone, LLP (57) ABSTRACT

An apparatus for parameterizing a plant includes a recorder for recording a three-dimensional data set of the plant including not only volume elements of non-covered elements of the plant, but also volume elements of elements of the plants that are covered by other elements, and a parameterizer for parameterizing the three-dimensional data set for obtaining plant parameters.

8 Claims, 10 Drawing Sheets representation of the 3D point cloud of a plant surface

Related U.S. Application Data continuation of application No. PCT/EP2014/059949, filed on May 15, 2014.

(51) Int. Cl.

| | | |
|---|---|---|
| *G06T 7/60* | (2017.01) | |
| *G06T 7/62* | (2017.01) | |
| *G06T 7/64* | (2017.01) | |
| *G06T 7/73* | (2017.01) | |
| *G06T 17/00* | (2006.01) | |

(52) U.S. Cl.
CPC ............... *G06T 7/62* (2017.01); *G06T 7/64* (2017.01); *G06T 7/75* (2017.01); *G06T 17/00* (2013.01); *G06K 2209/17* (2013.01); *G06T 2207/10072* (2013.01); *G06T 2207/10081* (2013.01); *G06T 2207/10088* (2013.01); *G06T 2207/10116* (2013.01)

(56) References Cited

U.S. PATENT DOCUMENTS

| | | | |
|---|---|---|---|
| 2005/0084176 A1* | 4/2005 | Talapov | A61B 5/0062 382/286 |
| 2006/0023078 A1 | 2/2006 | Schmitt et al. | |
| 2010/0322477 A1 | 12/2010 | Schmitt et al. | |
| 2015/0379350 A1* | 12/2015 | Li | A01G 1/001 382/110 |

FOREIGN PATENT DOCUMENTS

| | | |
|---|---|---|
| DE | 10301941 A1 | 8/2004 |
| EP | 1586193 B1 | 8/2011 |
| EP | 2422297 B1 | 3/2013 |

OTHER PUBLICATIONS

Li, Yangyan, "Analyzing Growing Plants from 4D Point Cloud Data" ACM Transactions on Graphics 2013.*

Dornbusch et al.; "A method to extract morphological traits of plant organs from 3D point clouds as a database for an architectural plant model," Ecological Modelling, Sep. 22, 2006; vol. 200; pp. 119-129.

Galbusera et al.; "Rigid and flexible spinal stabilization devices: A biomechanical comparison," Medical Engineering & Physics, 2011; vol. 33; pp. 490-496.

International Search Report in related PCT Application No. PCT/EP2014/059949 dated Sep. 10, 2014 (4 pages).

Kaminuma et al.; "Quantitative analysis of heterogeneous spatial distribution of *Arabidopsis* leaf trichomes using micro X-ray computed tomography," The Plant Journal, 2008; vol. 56; pp. 470-482.

Lorensen et al.; "Marching Cubes: A High Resolution 3D Surface Construction Algorithm," Computer Graphics, Jul. 1987; 21(4):163-169.

Ning et al.; "Tree Segmentation from Scanned Scene Data," Procedures of the Third International Symposium on Plant Growth Modeling and Applications, 2009; pp. 360-367.

Ouyang et al.; "On the normal vector estimation for point cloud data from smooth surfaces," Computer-Aided Design, 2005; vol. 35; pp. 1071-1079.

Stuppy et al.; "Three-dimensional analysis of plant structure using high-resolution X-ray computed tomography," Trends in Plant Science, Jan. 2003; 8(1):2-6.

International Preliminary Report on Patentability issued in related PCT Application No. PCT/EP2014/059949 dated Aug. 26, 2014 (original date of Written Opinion in German language) (10 pages).

* cited by examiner

APPARATUS AND METHOD FOR PARAMETERIZING A PLANT

CROSS-REFERENCE TO RELATED APPLICATIONS

This application is a continuation of co-pending U.S. patent application Ser. No. 14/941,093 filed Nov. 13, 2015 which is a continuation of International Application No. PCT/EP2014/059949, filed May 15, 2014, which is incorporated herein by reference in its entirety, and additionally claims priority from German Application No. 10 2013 209 109.5 filed May 16, 2013, which is also incorporated herein by reference in its entirety.

BACKGROUND OF THE INVENTION

The present invention relates to the detection of plants and, in particular, to the parameterization of plants for agricultural technology.

In agricultural technology, detecting plants is of significance wherein herein the so-called phenotyping of plants is to be mentioned. For three-dimensional detection of objects, different methods are common, such as strip light methods or light-slit methods. These methods provide a high spatial three-dimensional resolution. However, with regard to illumination, the same depend on defined environmental conditions. In the strip light method, different light patterns have to be subsequently projected onto the object, while in the light-slit method only one contour line is detected at a given time. Thus, for three-dimensional detection, the object has to be scanned.

Parameter extraction and, in particular, model-based parameter extraction are necessitated for phenotyping plants. Phenotyping is the derivation of a structural description from the appearance of a plant. Currently, phenotyping is an object of research in modern agricultural science, since by now the same is an important tool in agricultural fields, such as plant cultivation or plant production.

Two steps are necessitated for phenotyping. The first step is detection or capturing. First, a measurement system quantitatively detects the structural characteristics of a plant. For fast automated recording of the plant structure, imaging methods are suitable, wherein in particular for detecting the surface geometry of a plant mostly active or passive, typically optical 3D detection methods are used. These are, for example, laser light-slit or time-of flight sensor systems or stereoscopic systems by means of optical cameras. The second step is feature extraction. Normally, the measured values do not correspond to illustrative features of the plant structure. Thus, in the second step, transformation of the measurement values to relevant features takes place. Since the detected amount of data is generally quite large, normally, data reduction takes place in this step. For deriving complex leaf parameters from a measured point cloud, model-based feature extraction is suitable due to the flexible adaptation to different purposes of application. These parameters can be used, for example, for describing effects of a change in a genome of the plant on its appearance.

EP2422297B1 describes a concept where the plant is detected three-dimensionally in color and subsequently a leaf model is adapted to the measurement data. The leaf model is described by a number of parameters. The parameters calculated while adapting the model to the measurement data serve to describe the plant. Thereby, for example, the effect of a change in the genome of the plant on the habit of growth of the plant can be described parametrically.

When using the imaging optical measurement methods for detecting the 3D structure, it is problematic that only the optically accessible part of the plant can be detected. Object areas covered by other parts cannot be optically detected. This is undesirable, in particular when detecting plants, since leaves frequently cover one another as it is in particular the case with dense positioning of the leaves or tight tillering of the plant structure.

Missing object areas result in wrong measurement values. The determined leaf area of an only a partly detected plant, for example, does not correspond to the actual leaf area. On the other hand, an only partly detected plant makes the usage of complex feature extraction methods by using a model-based approach impossible when the same are based on preconditions about completely detected leaves. For example, if changes in the genome of the plant only have an effect on those leaves that are optically not accessible, the influence of the change in the genome on the habit of growth cannot be detected with this procedure.

Generally, it can be said that complete detection with optical means is impossible for plants that do not consist of very few leaves, due to unavoidable coverages.

SUMMARY

According to an embodiment, an apparatus for parameterizing a plant may have: a recorder for recording a three-dimensional data set of the plant, which does not only include volume elements of non-covered elements of the plant, but also volume elements of elements of the plant that are covered by other elements; a parameterizer for parameterizing the three-dimensional data set for acquiring plant parameters, wherein the parameterizer is implemented to convert the three-dimensional data set into a point cloud, wherein the point cloud only includes points on a surface of the plant or points of a volume structure of the plant, wherein the parameterizer is further implemented to segment the three-dimensional point cloud into single elements of the plant, wherein a single element is a leaf, a stem, a branch, a trunk, a blossom, a fruit or a leaf skeleton, and wherein the parameterizer is implemented to calculate, by using a single-element model, parameters for the single element by adapting the single-element model to the single element.

According to another embodiment, a method for parameterizing a plant may have the steps of: recording a three-dimensional data set of the plant, which does not only include volume elements of non-covered elements of the plant, but also volume elements of elements of the plant that are covered by other elements; and parameterizing the three-dimensional data set for acquiring plant parameters, wherein parameterizing includes: converting the three-dimensional data set into a point cloud, wherein the point cloud only includes points on a surface of the plant or points of a volume structure of the plant, segmenting the three-dimensional point cloud into single elements of the plant, wherein a single element is a leaf, a stem, a branch, a trunk, a blossom, a fruit or a leaf skeleton, and calculating, by using a single-element model, parameters for the single element by adapting the single-element model to the single element.

Another embodiment may have a computer program for performing the inventive method for parameterizing a plant when the computer program runs on a computer or processor.

The present invention is based on the knowledge that in contrary to incomplete optical detections a three-dimensional data set of the plant is to be detected, which does not only comprise volume elements of elements of the plant that are visible to the outside but also volume elements of covered elements of the plant. For that purpose, for example, computer tomographic methods, such as X-ray-CT methods or magnetic resonance tomography can be used. Thereby, the plant is completely detected and the resulting measurement data describe single elements, such as leaves, stems, branches, trunks, blossoms or fruits of the plant completely, independent of whether the respective single element has been covered by another single element of the plant or not. Thereby, in subsequent, for example model-based parameter extraction, correct parameterization can be performed for describing the habit of growth of the plant, even for covered parts of the plant.

Since X-ray computer tomography, is based, for example, on X-ray transmission images, structures of a plant that are optically covered can be detected. The same applies for magnetic resonance tomography and for other transmission methods or other three-dimensional complete detection methods. It has been found out that X-ray computer tomography allows the mapping of plant structures in a high-contrast and detailed manner in the X-ray image by means of a suitable configuration, such that the plant structures can be easily separated from the background, for example air, in the three-dimensional reconstruction by means of a processor processing the different tomographic images.

Above this, it is advantageous to perform parameter extraction by means of model-based extraction by using a general or specific leaf model, wherein a general leaf model is not tailored for a specific leave shape, while a specific leaf model is additionally characterized, for example, by previous knowledge on the examined plant. Thus, for example, tomatoes on the one hand or turnips on the other hand have clearly different leaf shapes and thus it can be advantageous, when it is known from the start that the examined plant is, for example, a tomato, to use a leaf model suitable for tomatoes, while, when it is known from the start that the plant to be examined is a turnip, to use a leaf model for turnips. Above this, model-based feature extraction is advantageous since the same can consider the high degree of detail of the three-dimensional complete data description in order to extract manifold and precise leaf features. On the other hand, this concept provides reliable leaf features, even with measurement data having only little detail. Measurement data having little detail can be obtained, for example, in that a computer tomography having X-rays is performed, wherein the X-ray dose emitted onto the plant is relatively reduced, for example when a lower local resolution is selected.

Thus, in an embodiment of the present invention, for obtaining computer tomography data, usage of X-ray cameras having a respectively coarse pixel resolution is advantageous. Thereby, the radiation dose necessitated for obtaining the measurement data can be heavily reduced. This can be necessitated in particular for multiple measurements, for example for determining the temporal curve of the plant growth for preventing damage of the plants by the x-radiation. Damaging the plant by x-radiation could have an effect on the plant growth to be monitored, which is to be prevented. A particularly low radiation dose can be obtained, for example, when using X-ray cameras having a scintillator screen converting the x-radiation into visible light, wherein the visible light of the scintillator screen is mapped onto one or several CCD cameras. By analog or digital binning, i.e., by analog or digital addition of adjacent pixel information to a super pixel, the radiation dose necessitated for imaging can be heavily reduced, accompanied by a respective loss of local resolution. Since CCD cameras, however, have a very high resolution, resolution reduction of the CCD cameras, for example by the factor 10 or the factor 20 is very unproblematic, in particular when the plant parameters are obtained subsequently by means of model-based parameter extraction, especially since previous knowledge on the plant or the plant leaves has already been incorporated in the model used for parameter extraction.

In an embodiment of the present invention, the three-dimensional plant structure is detected first by an X-ray CT system or by a magnetic resonance tomography system. The volumetric data set is then converted into a cloud of three-dimensional points, for example, by extracting an explicit isosurface representation of the plant surface by means of the marching cubes method or an alternative method, such as a threshold method. In a further step, the three-dimensional points of the cloud are segmented from three-dimensional points into single elements, such as single leaves, for example by finding point clusters. In particular in a completely detected 3D reconstruction representation that includes not only the optically accessible but also the covered structures, this is significantly more accurate and simpler than with incompletely detected surface data. In a further step, the leaf parameters are extracted by means of a general model or a model already adapted for the individual plant.

BRIEF DESCRIPTION OF THE DRAWINGS

Embodiments of the present invention will be detailed subsequently referring to the appended drawings, in which:

FIG. 2b is an illustration of a structure of the X-ray camera of FIG. 2a;

DETAILED DESCRIPTION OF THE INVENTION

Figure 1:
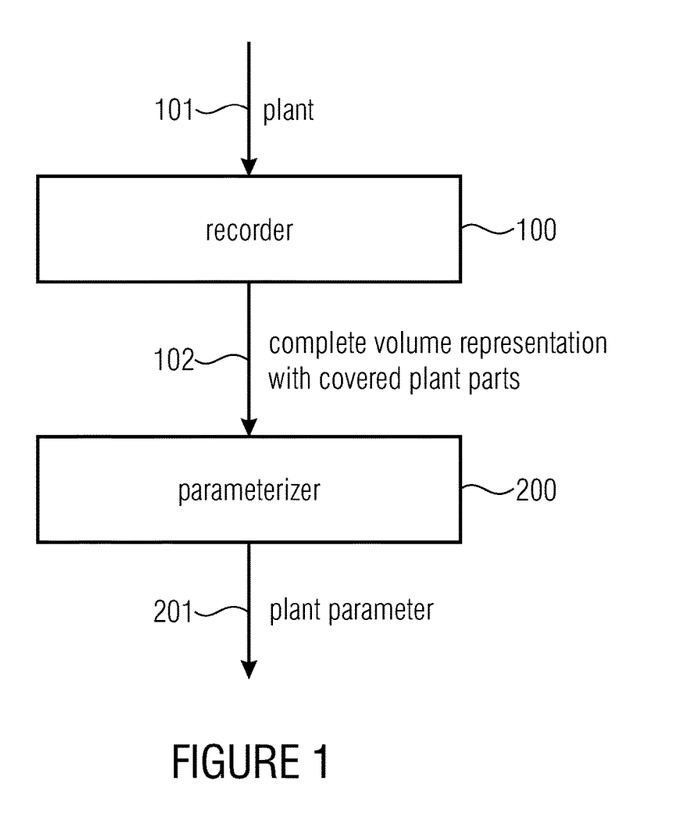
FIG. 1 is a block diagram of the apparatus for parameterizing a plant.

FIG. 1 shows an apparatus for parameterizing a plant. A recorder 100 is implemented to record a three-dimensional data set of a plant 101. The three-dimensional data set does not only have volume elements of the plant that are visible to the outside or optically visible, but also includes volume elements of covered elements of the plant. Thus, the three-dimensional data set not only detects a representation of non-covered elements of the plant but also volume elements of elements of the plant that are covered by other plant elements. This data set is also referred to as complete data set.

This complete volume representation which can be given, for example, as voxel grid, wherein each voxel comprises both a three-dimensional coordinate with respect to an originating coordinate as well as at least one or several intensity values, is then fed into a parameterizer 200 that is implemented to parameterize the three-dimensional data set, for example the voxel grid, for obtaining plant parameters 201. The complete volume representation, i.e., the volume representation 102 with non-covered and covered plant parts is converted into plant parameters 201 by the parameterizer 200. Thereby, the data reduction to relevant parameters necessitated, for example, for phenotyping is obtained. When it is exemplarily assumed that the recorder provides a volume representation with 1000 elements in length, 1000 elements in width and 1000 elements in height, the volume representation has 109 voxels. When it is further assumed that the plant includes 10 leaves and for each of the 10 leaves, for example, 10 parameters are obtained, the 1 billion voxels at the output of block 100 of FIG. 1 will merely be 100 parameter values at the output of block 200.

Figure 2A:
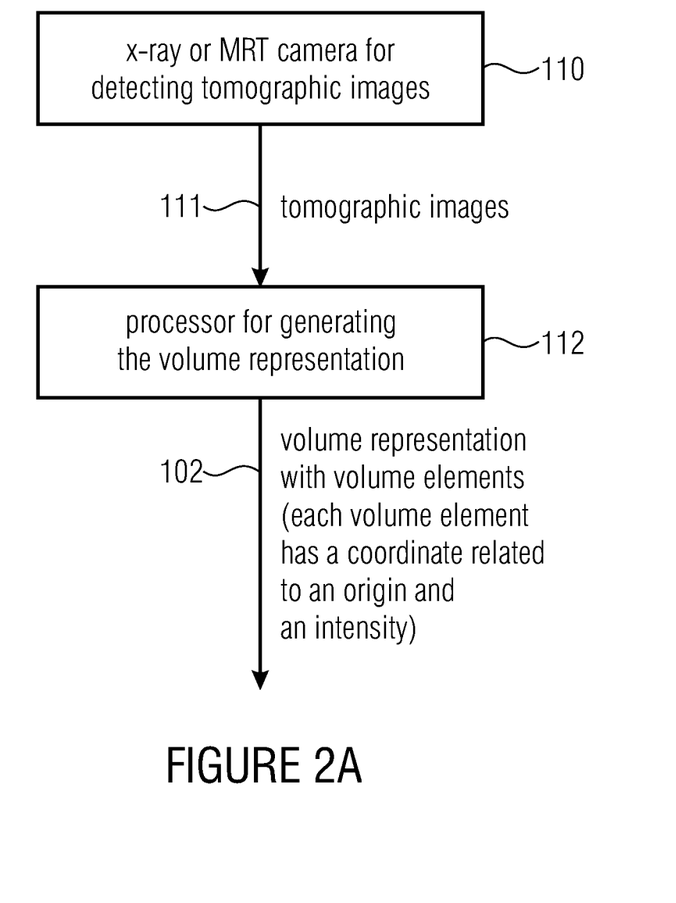
FIG. 2a is a block diagram of an implementation of the recorder of FIG. 1.
Figure 2B:
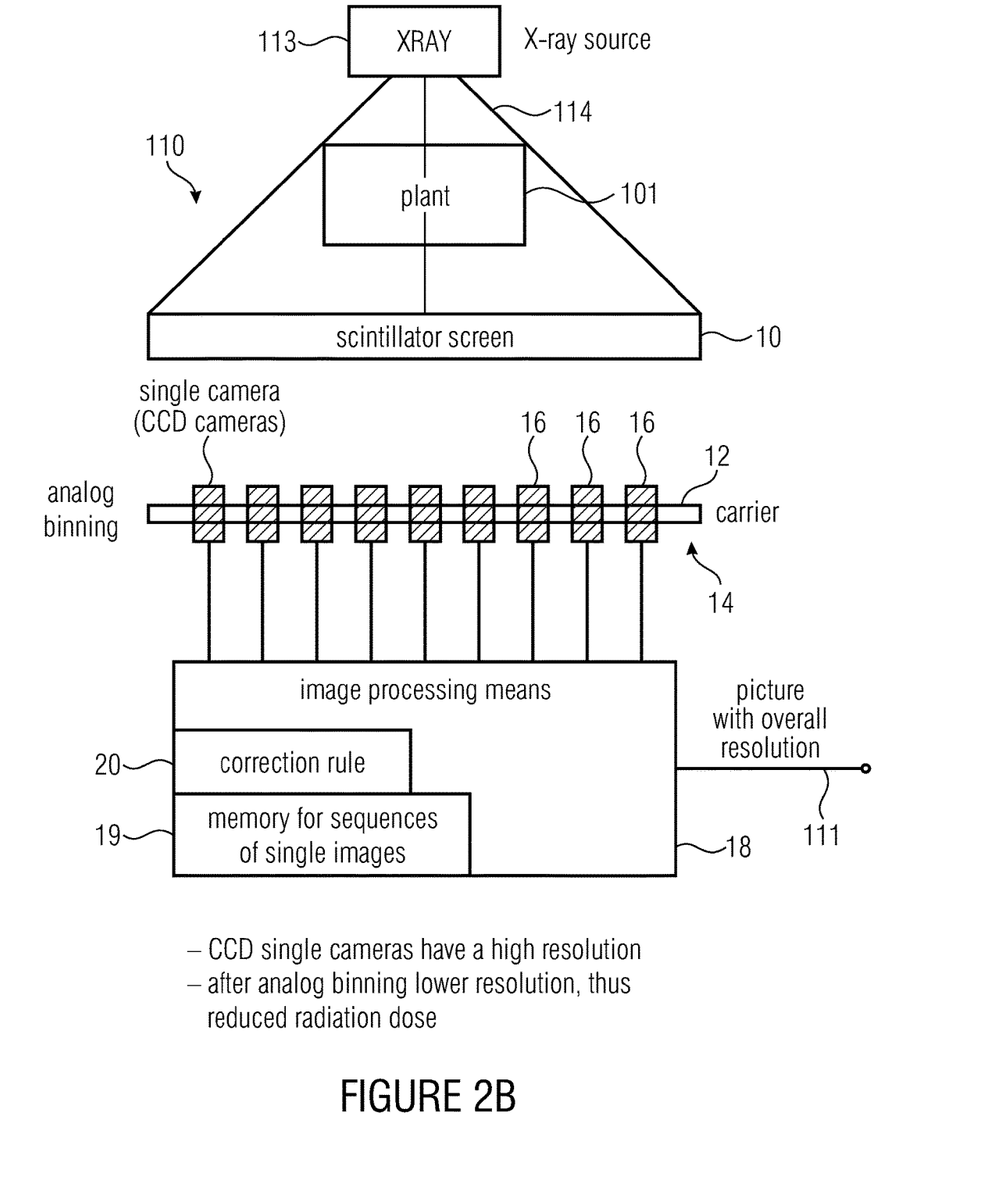

FIG. 2a shows an implementation of the recorder 100 of FIG. 1. In particular, the recorder 100 of FIG. 1 is implemented to perform an X-ray CT method or a magnetic resonance tomography method for obtaining the three-dimensional volume representation. An X-ray or MRT system 110 provides the volume representation 102 or 111 in FIG. 2b. The volume representation has individual volume elements, wherein each volume element comprises a coordinate in relation to one and the same origin and advantageously only a single intensity. FIG. 2b shows an implementation of an X-ray camera 110 of FIG. 2a. The X-ray camera includes an X-ray source 113 transmitting X-rays 114 through a plant 101. The X-rays reach a scintillator screen 10. Further, the camera includes a camera carrier 12 having an array of camera mounts 14. The camera mounts are implemented for being able to mount a single camera 16 in a camera mount. The camera mount 12 is advantageously implemented as a plate having bores arranged in a predetermined pattern, wherein an adjustment screw, for example, is provided at each bore for inserting a cylindrical camera, whose diameter is slightly smaller than the diameter of the bore, into the bore and to adjust the same by means of an adjustment screw. Alternative options can also be used, for example camera carriers having slightly conical bores for placing single cameras having a slightly conical outside diameter into the conical bores, such that no adjustment screws or other mounts are necessitated, since merely the press fit force of the camera into the camera carrier is sufficient.

The camera includes an array of optical single cameras 16, wherein each optical single camera is mounted on an allocated camera mount 14. Further, each single camera includes a light sensor and an optics mapping means, wherein the light sensor and the optics mapping means are effective to capture a partial area of the screen area of the screen 10 with a specific resolution. Thus, each single camera 16 provides a single image with a predetermined resolution.

It should be noted that optics assemblies could be implemented in any way. For financial reasons, a lens assembly, which can include one or several lenses, depending on the implementation, is advantageous as optics assembly. Alternative optics assemblies include mirror assemblies, fiber optics, etc., or also a combination of different optical mapping means.

Further, the camera includes an image processing means 18 for processing the digital single images of the array of optical single cameras 16 for generating the optical image of the screen with the predetermined overall resolution. In detail, the image processing means 18 is effective to submit the digital single images to a correction for reducing orientation inaccuracy and/or parameter variations in the array of optical single cameras 16 and advantageously to completely eliminate the same. For correcting a single image, during calibration preceding capturing, a specific correction rule 20 is used, which is typically stored on a suitable memory medium in the image processing means 18 or even hard-wired. Thus, the correction takes place with the rule determined during calibration with a correction resolution that is higher than the predetermined overall resolution of the optical overall picture desired in the end, and which is lower or equal to the single resolution by which the optical single cameras provide single images, although this is not essential. Finally, the image processing means is effective to obtain corrected single images or a corrected overall image. Combining the single images to the overall image can thus take place after correcting the single images with the correction rule determined for each single image, i.e. for each single camera. Thus, at the output of the image processing means 18, after the CT or MRT reconstruction, a volume picture including all information, i.e. also the covered structures, is obtained. In this implementation, the fact is used that by using several cameras, the available image elements (pixels) increase proportionally to the number of cameras. Frequently, however, no greater number of pixels than the one that a single camera would provide is necessitated. If, for example, four optical cameras are used, in this case, four pixels each can be added up. This is particularly advantageous when the charge can be added up already on the sensor, as it takes place in CCD sensors by the so-called analog binning. In this case, the charge has to be read out electronically only once and thus the electronic noise generated by this process occurs only once. Thus, the overall signal-to-noise ratio is improved compared to the case when each pixel is read out individually and digitally added.

Due to the fact that the signal-to-noise ratio is significantly increased by analog binning, the dose of the X-ray source can be reduced, for obtaining a necessitated signal-to-noise ratio at the output of the single cameras performing analog binning for obtaining, from individual pixels, a super pixel having a poor local resolution.

Thus, the single CCD cameras have a high resolution. After analog binning, a lower resolution is obtained, but with a heavily improved signal-to-noise ratio, such that the radiation dose of the X-ray source 113 can be accordingly reduced, for sparing the plants or for making sure that damage of the plant by the X-radiation is prevented with regard to the plant growth to be monitored when several pictures of the plant are necessitated.

Figure 3:
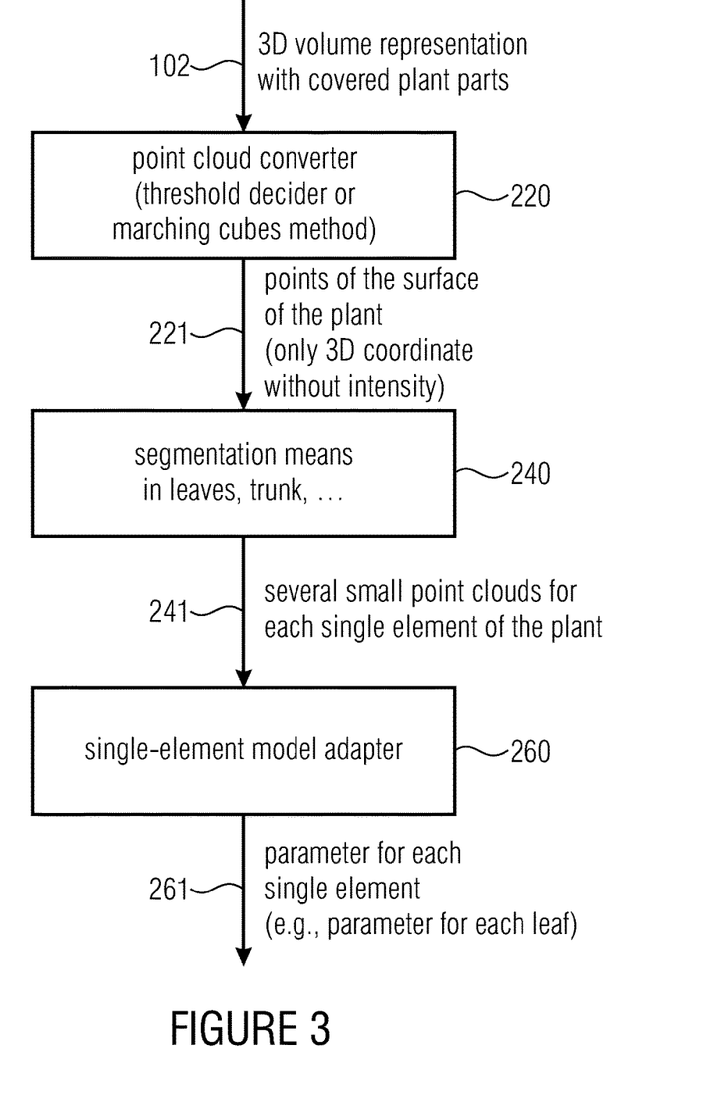
FIG. 3 is a block diagram of an implementation of the parameterizer of FIG. 1.

In the embodiment shown in FIG. 2b, illustrating the X-ray camera 110, the screen 10 is a scintillator screen where the X-ray light is converted to visible light. The array of single cameras 16 lies behind the scintillator screen 10, wherein each single camera captures or maps one part of the scintillator screen. For specific tasks, where usually a line scan camera is used, the array of optical single cameras is reduced to a one-dimensional array including a linear arrangement of optical single cameras. The areas mapped by the single optical cameras can either be immediately adjacent or slightly overlap each other for reducing the adjustment effort which will typically arise on the mechanical side. If the partial images or single images overlap, it is advantageous to perform electronic correction as has already been illustrated. With regard to further implementations of the camera, reference is made to EP 1 586 193 B1, which is incorporated herein by reference. FIG. 3 shows an implementation of the parameterizer 200 according to an embodiment of the present invention.

The parameterizer includes a point cloud converter 220, a segmentation means 240 and a single element model adapter 260. The point cloud converter 220 is implemented to receive the three-dimensional volume representation 102 with covered and non-covered plant elements. From the individual voxel elements, the point cloud converter 220 generates a point cloud 221 comprising points on a surface of the plant. Each point is now only represented by its coordinate, which is derived from the coordinate of a respective volume element or corresponds to the same. In one of the implementations, the derivation of the coordinate of a point of the point cloud 221 means that the center or focus of a volume element is taken as a coordinate of a point. However, the point cloud 221 does not have to correspond one-to-one to single volume elements. Instead, for example in the marching cubes method, interpolation is performed, such that when it is determined that two adjacent pixels are such that one pixel is an air pixel and the other pixel a plant pixel, under predetermined prerequisites as known in the art, interpolation is performed between these two voxels, wherein the point cloud is then illustrated by interpolated volume elements. Deriving the coordinates of a volume element can thus also be an interpolation of adjacent volume elements. The marching cubes method is a known algorithm for calculating isosurfaces in 3D computer graphics. The same approximates voxel graphics by polygon graphics. The first description can be found in William E. Lorensen, Harvey E. Cline: "Marching Cubes: A High Resolution 3D Surface Construction Algorithm", *Computer Graphics*, Vol. 21, No. 4, July 1987, pp. 163-169.

However, alternative procedures in the point cloud converter can be used, such as a simple threshold decision based on the intensity. A higher intensity of a volume element shows that the same was air, while a lower intensity of a volume element shows that absorption of the X-radiation has already taken place in the plant and the same is thus a volume element belonging to the plant or to the plant surface. A threshold decision would be to eliminate all volume elements having a greater intensity than a predetermined value, such that only those volume elements belonging to a plant element remain.

In particular in leaves or flat plant elements, the voxels already nearly represent a surface, since a leaf will typically have a thickness of one or several voxels. Other leaf structures, such as the leaf skeleton, clearly visible in FIG. 8, also called leaf veins, have a volumetric structure and no area structure. The leaf skeleton can already present valuable parameters useful for phenotyping. Then, segmentation and parameter extraction are performed from the volumetric data directly or after point cloud conversion, for describing the plant skeleton parametrically.

The result of the point cloud converter 220 is a cloud of three-dimensional points, which can either be given as single points or, as it is the case in the marching cube method, can be an explicit isosurface representation or a polygon area representation of the plant surface. The marching cube method is particularly advantageous since the same performs, in addition to differentiating between volume elements of the plant on the one hand and of the background on the other hand, also interpolation and thus states exactly the border or interface between plant and background, i.e. air. Thus, in the implementation of the point cloud converter, thus, a complete surface of the plants in front of the background is obtained from the complete volume data set, wherein this surface includes all leaf stems, branches, etc.

This area representation is then fed into the segmentation means 240 that is implemented to convert the three-dimensional point cloud as obtained by block 220 into single elements as illustrated at 241. Depending on the implementation, the single elements can be several small point clouds, for example for a leaf, a stem, a trunk, a blossom or a fruit of the plant or can already be polygon areas in whatever representation.

Then, the segmented representation 241 is fed into the single element model adapter 260 that is implemented to extract, by using a general single element model or a single-element model already specified by previous knowledge about the plant, the parameters for each single element by adapting the single element model to the respective segmented single element.

On the output side, the single-element model adapter provides the parameters 260 for each single element, e.g. the parameters for each leaf. Depending on the implementation of the present invention and the application, the parameter, in particular for a leaf, can be a leaf length, a leaf width, a leaf area, an inclination of a leaf with regard to the stem, an orientation of the leaf with regard to a plant main axis, i.e. in the top view an orientation to the top, bottom, left or right, etc., a twist with regard to a leaf axis, a leaf arch, a leaf shape or a leaf outline. Further parameters are in particular indications for errors in the leaf outline, for example by pest infestation, etc. Further useful plant parameters include corrugations at the edge or in the area of the leaf, a folding of the leaf halves, or rolling-in of the leaf along or transversal to the leaf axis.

Figure 4:
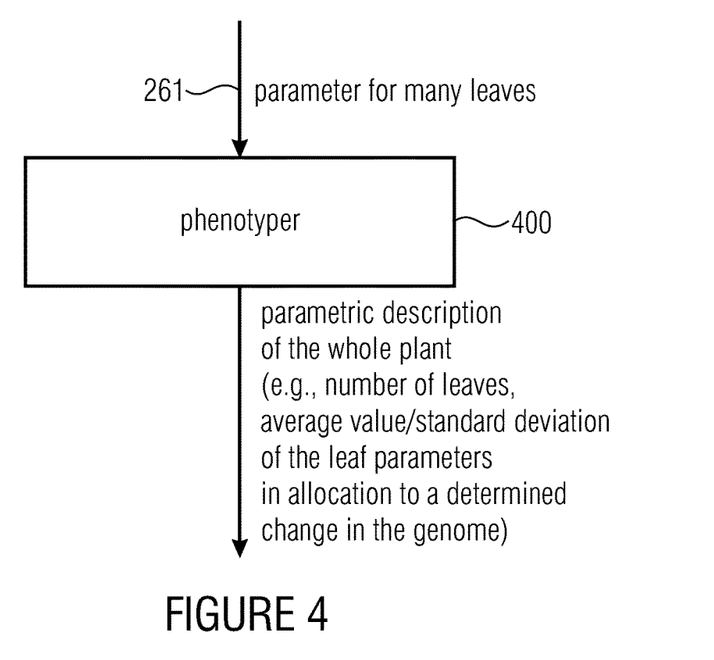
FIG. 4 is an application of the extracted parameters at the example of a phenotyper.

The parameters 261 obtained in FIG. 3 for many leaves can then be fed into a phenotyper 400. The phenotyper 400 provides a parametric description of the whole plant, stating as values, for example, the number of leaves, the average value and/or the standard deviation of the individual leaf parameters in allocation to a specific change in the genome. Thus, an agricultural scientist will now able to obtain, based on the parametric description of the whole plant at the output of block 400 of FIG. 4, a simple allocation and knowledge of which change in the genome results in which effects on leaf orientation, leaf area, etc. In particular, the leaf orientation is of great interest in that an orientation closer to the sun or in the optimum right angle to the sun causes high photosynthesis activity of the leaf and hence results in a greater and faster growth of the leaf.

Although FIG. 3 represents an implementation where the segmentation takes place after point cloud conversion, in another implementation, alternatively or additionally, segmentation can be performed directly with the three-dimensional representation, to subsequently convert the segmented elements into a point cloud consisting only of one single element, or to directly parameterize the single element still consisting of voxels. For segmenting the three-dimensional data set, the fact, for example, that stems of leaves are normally thinner than the leaf can be used, such that segmentation can be performed by "cutting off" or "separating" the data set at a thinner location.

Figure 5:
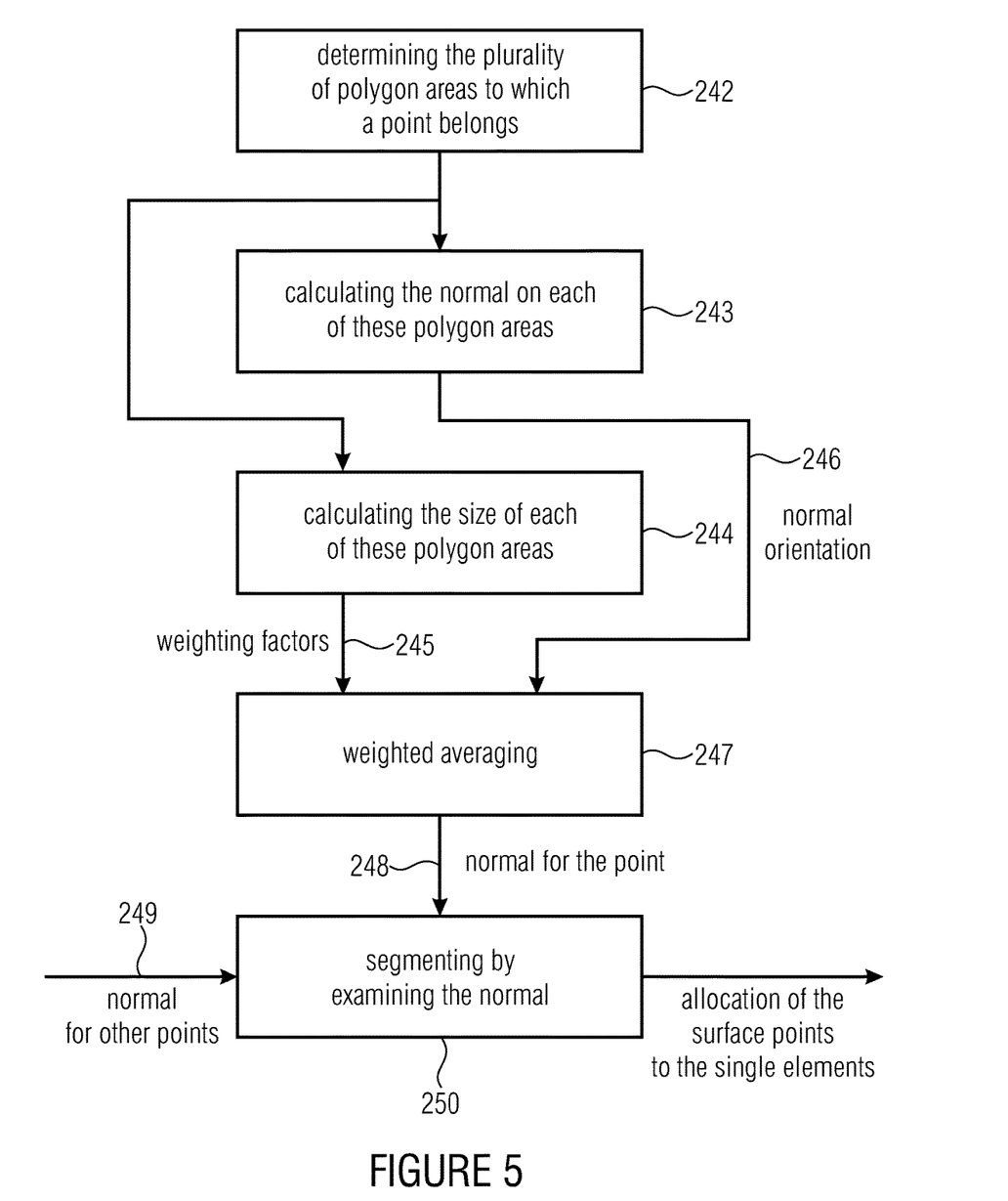
FIG. 5 is an implementation of the segmentation means of FIG. 3.

FIG. 5 shows a flow diagram for an implementation of the segmentation means 240 of FIG. 3. In a step 242, a plurality of polygon areas is determined to which a point of the point cloud 221 belongs. In a step 243, a normal is calculated on each of these polygon areas. The polygon areas are triangular areas or areas having more corners, such as four, five, six, corners. A normal on the polygon area is used for quantifying the orientation of this polygon area. Thereupon, in a step 244, the size of each of these polygon areas is calculated.

The size of each polygon area results in a respective weighting or respective weighting factor 245 allocated to this polygon area, while the individual normals are shown on the respective polygon area at 246. Both the weighting factors 245 and the normals 246 are used in the step 247 for performing weighted averaging of the individual area normals 246. The greater the area of a polygon area, the higher the weighting factor for this polygon area, such that in the step of weighted averaging 247, the polygon areas or the normals of the polygon areas for which a greater size has been calculated have a greater influence. Thereby, a normal 248 is obtained for each point of the point cloud 221 of FIG. 3. Based on the consideration of the normal for the respective points, and in particular also for adjacent points as illustrated at 249, the actual segmentation is performed in step 250, in that the individual normals are examined for adjacent points.

In step 244, where the plurality of polygon areas is determined, to which a point belongs, a sphere having a specific diameter can be formed around a point for obtaining all polygon areas to which a point belongs. Alternatively, a circle can be formed, when a two-dimensional area of the plant surface exists, as it will frequently be the case for surfaces. Above that, it should be noted that, depending on the implementation, the step of averaging 249 can also be performed in an unweighted manner, such that the size of the polygon areas is not necessarily incorporated in the calculation.

In the step 250 of segmenting, the individual normals of adjacent points can be examined, wherein depending on the implementation, a threshold decision or a more expensive method can be used. One option is the calculation of differences of the normal orientation between adjacent points for determining, when the difference lies within a specific deviation, that the points belong to the same surface, while when the differences between adjacent points are greater than a deviation according to a predetermined threshold, the same belong to different single elements. When considering, for example, a leaf arranged at a stem, a very significant normal change will occur exactly at the position where the leaf leaves the stem, since this is a specific edge. On the other hand, leaves typically also have leaf arches, such that specific deviations from point to point of the sheet normal when the same take place slowly or relatively slow indicate that all these points belong to a specific leaf. Depending on leaf and effort, further criteria can be incorporated, such as previous knowledge on an expected leaf shape, etc., in order to check and to verify the plausibility of the segmentation decision in block 250 and to possibly correct a decision.

In the marching cubes method, for example, a polygon representation already exists. If this is not the case, the normal can still be used. For this, the local neighborhood around a point is found by a sphere around this point. All points lying within the sphere having a defined radius form this local neighborhood. Then, a plane fitted into this neighborhood and the normal on this plane is the normal allocated to that point. Then, segmentation is performed based on the normal as described.

Figure 6:
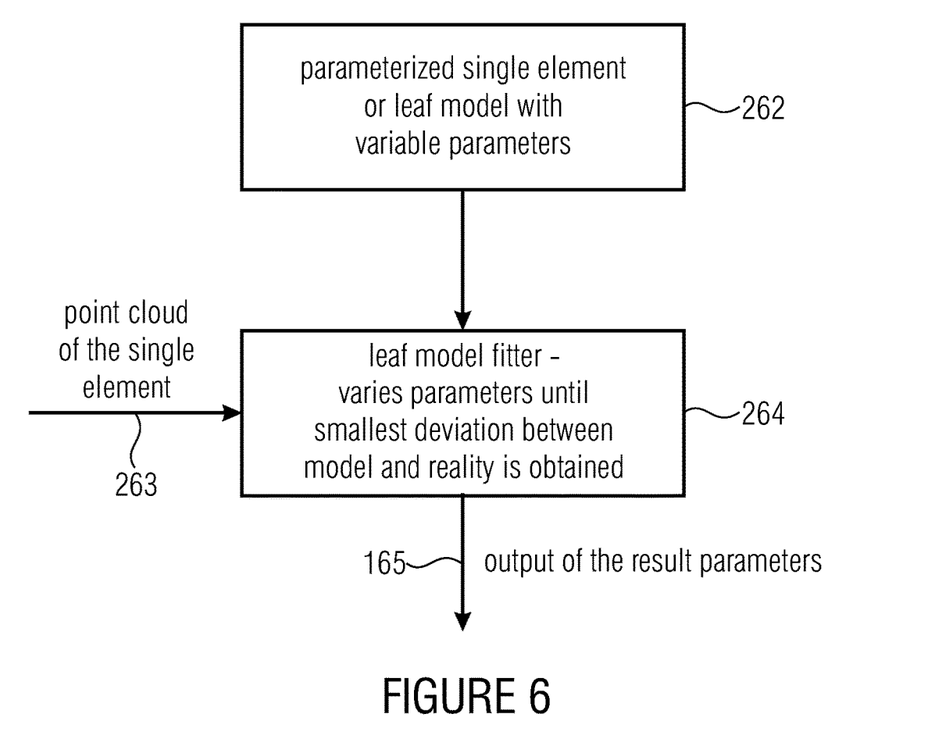
FIG. 6 is an implementation of the single element model adaptor of FIG. 3.

FIG. 6 shows an implementation of the single-element model adapter 260 of FIG. 3. A parameterized single element or leaf model having variable parameters is provided for a specific element in a block 262. Then, the model of block 262 is fed into a leaf model fitter 264 together with the point cloud 263 that has been obtained by step 250 of FIG. 5. The leaf model fitter is implemented to vary the parameters of the model provided in block 262 for so long according to specific optimization criteria until a smallest deviation between model and reality, i.e. the point cloud 263 of the single element is obtained. In particular, a variation of the variable parameters can take place in that, for example, according to the method of least error squares, a smallest deviation between the individual points of the parameterized model and the point cloud 263 of the single element is obtained. The results are the parameter sizes 265 that have been obtained from leaf model fitting 264. These result parameters can then be output and represent the plant parameters 201 of FIG. 1. Other leaf model fitting methods can be used, such as models operating in the sense of an "elastic band" fixed at respective supporting points, such that deviations at the leaf edge or in the leaf area are obtained with respect to an expected geometry, which could not be detected in a simpler model. When a leaf has, for example, an indentation because of pest infestation, which might have been caused by pests removing the piece of the leaf at the edge, such a model would parameterize this edge or this deviation from the optimum geometry as well. In contrast to a simpler model with expected leaf geometry, such a model additionally comprises free parameters, or additional parameters can be used in the optimization process, such that the number of output parameters in such a model depends on the point cloud of the single element 263 and is not given in advance. Further fitting methods operating alternatively to the two above-described methods can also be used for obtaining the result parameters 201 of FIG. 1.

Figure 7A:
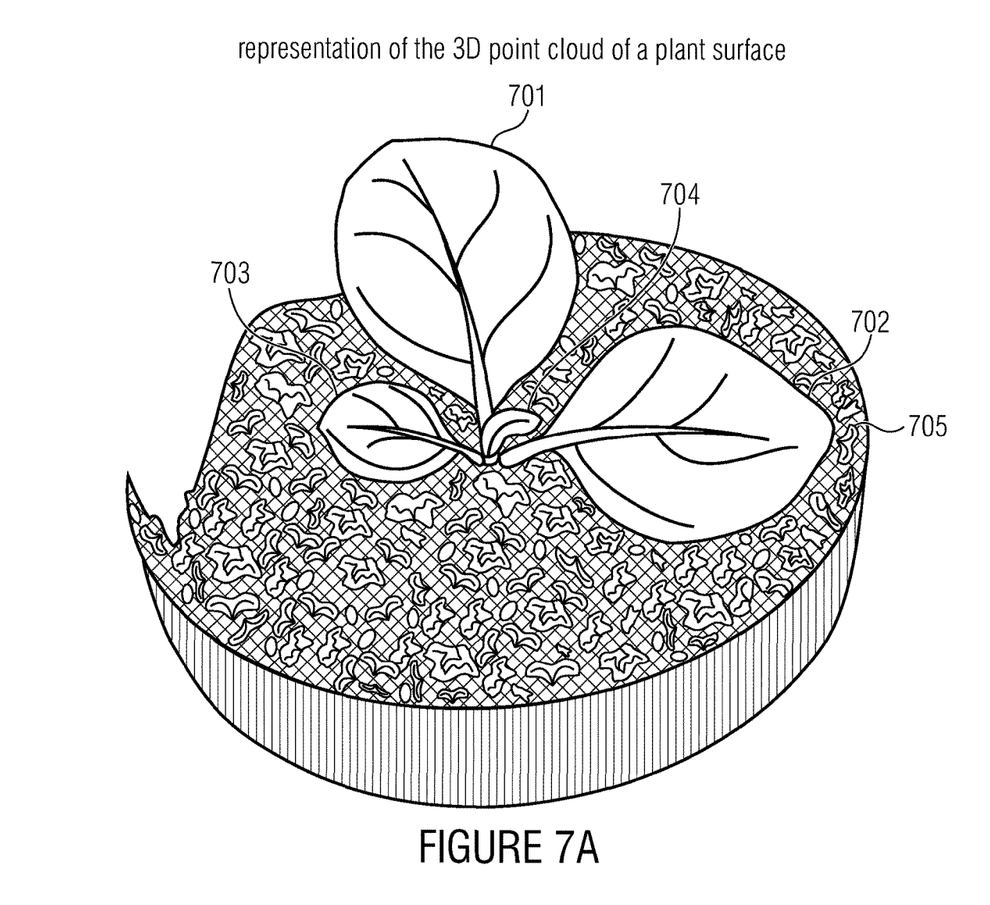
FIG. 7a is an illustration of the three-dimensional point cloud of the plant surface as obtained, for example, by the point cloud converter of FIG. 3.

FIG. 7a shows an illustration of the 3D point cloud of a plant surface as obtained at the output of block 220 of FIG. 3. Here, four leaves 701, 702, 703, 704 that have already been separated from the background can be clearly seen. The three-dimensional point cloud illustrated in FIG. 7a, however, is not yet segmented into the single leaves. Further, the growth substrate, i.e. the ground 705, is also not segmented. Based on necessitated geometric parameters, i.e. based on height values lying below a specific threshold, the earth or ground 705 can be easily eliminated when necessitated.

Figure 8:
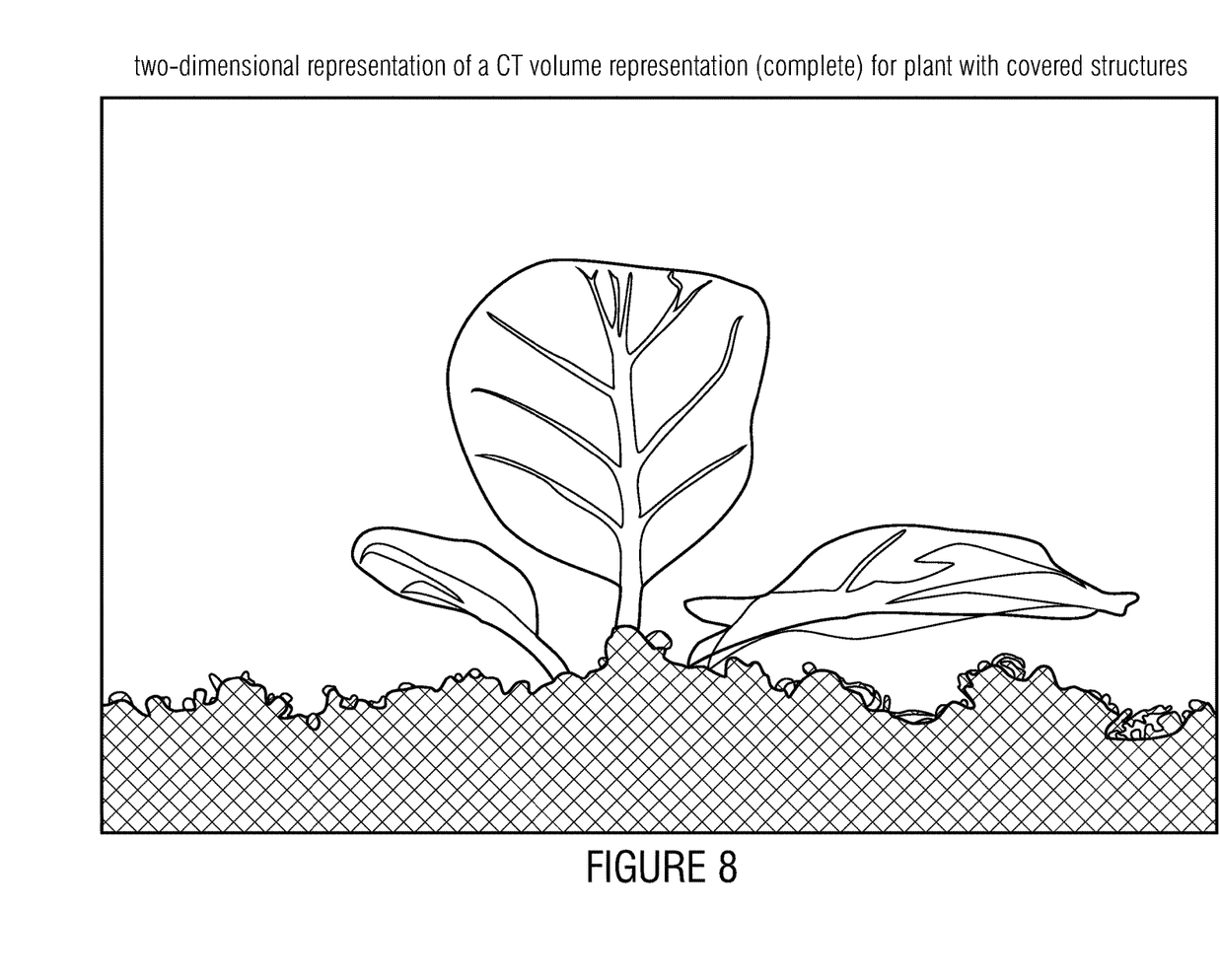
FIG. 8 is a two-dimensional representation of a CT volume representation, i.e., a complete volume representation with covered structures of a plant as obtained, for example, by the recorder of FIG. 1.

In contrast, FIG. 8 shows a two-dimensional illustration of a complete CT volume representation with covered and non-covered structures for the plant shown in FIG. 7a, wherein again the four leaves can be seen clearly. In complicated plants having a dense leaf position such that leaf elements are covered in any viewing direction, the complete reconstruction in the sense of FIG. 8 would also include all these covered structures.

Figure 7B:
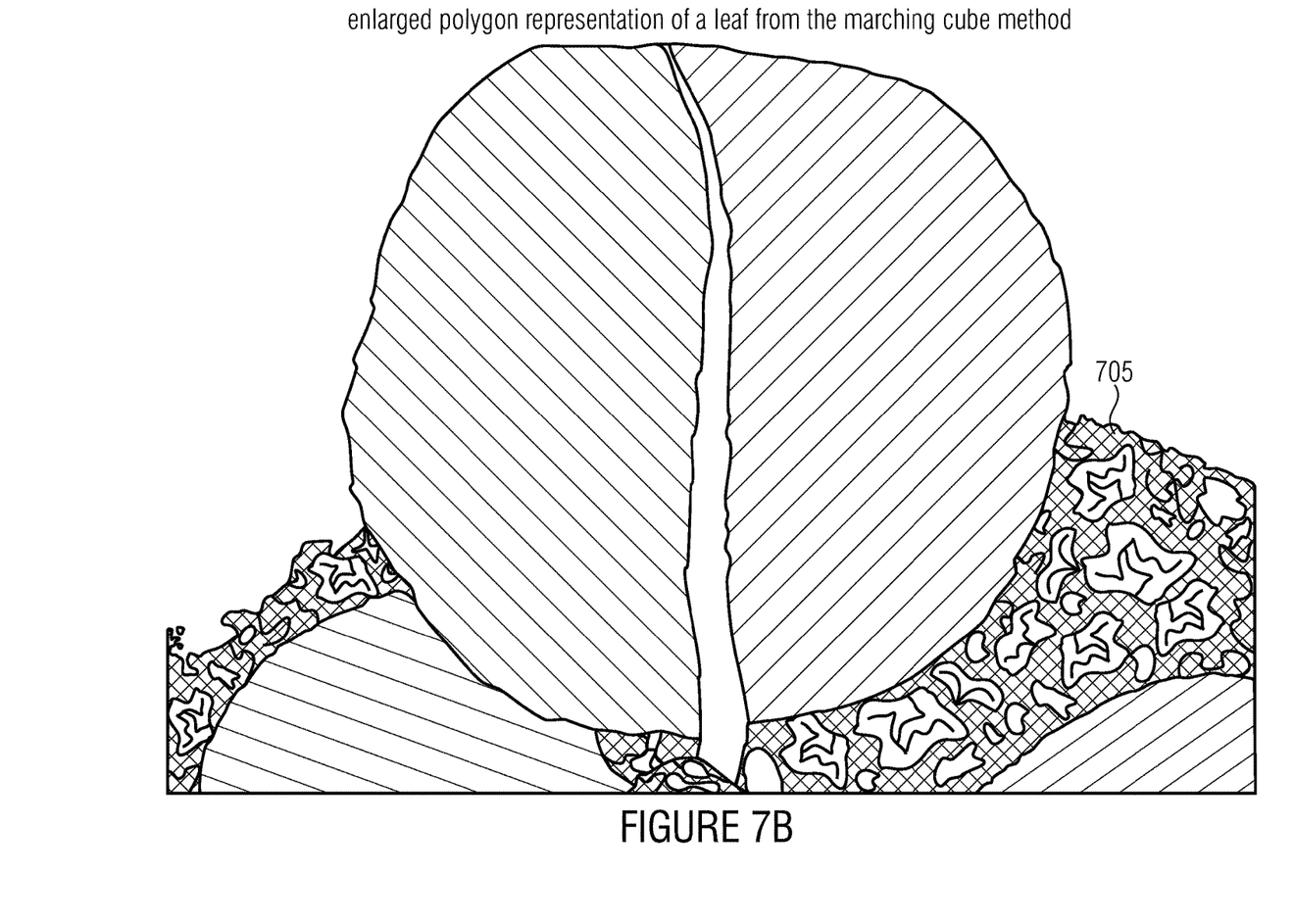
FIG. 7b is an enlarged polygon representation of a leaf as obtained by the point cloud converter of FIG. 3 when the same applies the marching cubes method.

FIG. 7b shows an enlarged polygon representation of a leaf as obtained from the marching cubes method, wherein FIG. 7b schematically shows individual polygon areas of different sizes, wherein this representation in FIG. 7b or the underlying data set can be used for obtaining segmentation in that the leaf is separated from its stem or separated from the background 705, in order to then perform with the single leaf, i.e. the single element, a parameter fitting method as described based on block 264 in FIG. 6.

While some aspects have been described in the context of an apparatus, it is obvious that these aspects also represent a description of the respective method, such that a block or device of an apparatus can also be seen as a respective method step or as a feature of a method step. Analogously, aspects described in the context of a method step or as a method step also represent a description of a corresponding block or detail or feature of a corresponding apparatus.

Some or all of the method steps may be executed by (or using) a hardware apparatus, like for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, a hard drive or other magnetic or optical memory having electronically readable control signals stored thereon, which can cooperate or cooperate with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may for example be stored on a machine readable carrier.

Other embodiments comprise the computer program for performing one of the methods described herein, wherein the computer program is stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can be electronical or optical. The receiver may, for example, be a computer, a mobile device, a memory device or the like. The apparatus or system may, for example, comprise a file server for transferring the computer program to the receiver.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, in some embodiments, the methods are performed by any hardware apparatus. The same can be a universally usable hardware, such as a computer processor (CPU) or hardware specific for the method, such as an ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for parameterizing a plant, comprising:
   a recorder for recording a three-dimensional data set of the plant, which does not only comprise volume elements of non-covered elements of the plant, but also volume elements of elements of the plant that are covered by other elements;
   a parameterizer for parameterizing the three-dimensional data set for acquiring plant parameters,
   wherein the parameterizer is implemented to convert the three-dimensional data set into a three dimensional point cloud, wherein the three-dimensional point cloud only comprises points on a surface of the plant, or wherein the three-dimensional point cloud only comprises points of a volume structure of the plant,
   to segment the three-dimensional point cloud into a plurality of single elements of the plant, wherein a single element of the plurality of single elements of the plant comprises at least one of selected from the group consisting of a leaf, a stem, a branch, a trunk, a blossom, a fruit skeleton, and a leaf skeleton, and
   to calculate, by using a single-element model, parameters for the single element of the plurality of single elements of the plant by adapting the single-element model to the single element of the plurality of single elements of the plant.

2. The apparatus according to claim 1, wherein the recorder is implemented to perform an X-ray computer tomography method or a magnetic resonance tomography method for acquiring the three-dimensional data set, wherein a volume element of the three-dimensional data set comprises a three-dimensional coordinate and at least one intensity value.

3. The apparatus according to claim 1, wherein the parameterizer is implemented to represent the points of the three-dimensional point cloud only by a coordinate derived from the coordinate of a respective volume element or corresponding to the same.

4. The apparatus according to claim 1, wherein the single element of the plurality of single elements of the plant is a leaf and wherein one or several plant parameters are calculated, wherein the one or several plant parameters are selected from the group comprising the following plant parameters:
   a leaf length, a leaf width, a leaf area, an inclination of a leaf with regard to the stem, an orientation of the leaf with regard to a plant main axis, a twist with regard to a leaf axis, a leaf arch, a leaf shape, a leaf outline, errors in an expected leaf outline, corrugations at the edge of the leaf, corrugations in the area of the leaf, a folding of the leaf halves, rolling-in of the leaf along the leaf axis, and rolling-in of the leaf transversal to the leaf axis.

5. The apparatus according to claim 1,
wherein the parameterizer is implemented to determine, by means of an intensity threshold, volume elements belonging to the plant, wherein the three-dimensional point cloud essentially comprises no points belonging to a background of the plant.

6. The apparatus according to claim 1,
wherein the parameterizer is implemented to determine the three dimensional point cloud, which comprises an interface between the plant and a background, by using a marching cubes method.

7. A method for parameterizing a plant, comprising:
recording a three-dimensional data set of the plant, which does not only comprise volume elements of non-covered elements of the plant, but also volume elements of elements of the plant that are covered by other elements; and
parameterizing the three-dimensional data set for acquiring plant parameters, wherein the parameterizing comprises:
converting the three-dimensional data set into a three-dimensional point cloud, wherein the three-dimensional point cloud only comprises points on a surface of the plant or wherein the three-dimensional point cloud only comprises points of a volume structure of the plant,
segmenting the three-dimensional point cloud into a plurality of single elements of the plant, wherein a single element of the plurality of single elements of the plant comprises at least one of a leaf, a stem, a branch, a trunk, a blossom, a fruit skeleton, and a leaf skeleton, and
calculating, by using a single-element model, parameters for the single element of the plurality of single elements of the plant by adapting the single-element model to the single element of the plurality of single elements of the plant.

8. Non-transitory storage medium having stored thereon a computer program for performing the method for parameterizing a plant according to claim 7 when the computer program runs on a computer or a processor.

* * * * *